Figure 1:
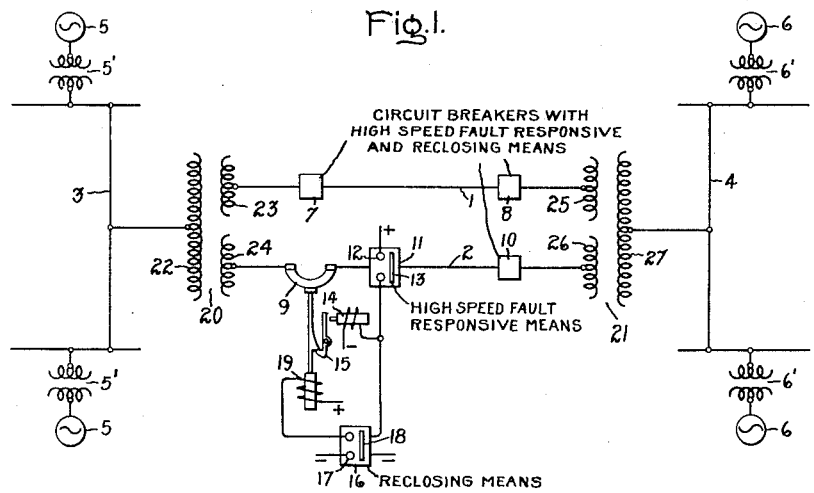

June 8, 1943.    C. A. WOODROW    2,321,444
ELECTRIC POWER SYSTEM
Filed Aug. 8, 1942

Inventor:
Charles A. Woodrow,
by Harry E. Dunham
His Attorney.

Patented June 8, 1943

2,321,444

UNITED STATES PATENT OFFICE 2,321,444

ELECTRIC POWER SYSTEM

Charles A. Woodrow, Schenectady, N. Y., assignor to General Electric Company, a corporation of New York Application August 8, 1942, Serial No. 454,129

7 Claims. (Cl. 172—237)

My invention relates to electric power systems and more particularly to the transmission and distribution of electric power in alternating current systems wherein stability is a problem.

One of the most important considerations in the operation of any of the large power systems of today is that of system stability which as a condition dependent upon the ability of the synchronous machines of such systems to operate in synchronism. It is necessary to maintain stability under steady state conditions where the system variables change slowly without transient disturbances and also under transient conditions which arise from load changes, switching operations and circuit faults. An important aspect of the stability problem is with respect to transient disturbances and my invention is concerned more particularly with improvements in power system apparatus and coordination thereof whereby the transient stability limit of power systems may be improved.

It is now recognized that the transient stability limits of certain systems may be improved by the use of circuit breakers arranged to open rapidly upon the occurrence of a fault, thereby to interrupt the fault current, and then to reclose after an interval of time sufficient generally to allow fault disappearance thereby reestablishing and reinforcing the electrical tie between synchronous machines involved for the purpose of insuring stability. The term "fault" is used herein in a generic sense to include a short circuit between conductors, the grounding of a phase conductor, or conductors, and generally any abnormal condition of operation imposed upon a transmission system. In such systems as have heretofore been used with high speed reclosing circuit breakers, there are certain conditions which limit the improvement in transient stability regardless of how fast the reclosing is effected. One limitation with normal fault clearing time and within the usual range of connected inertia is the amount of the fault shock as measured by the increase in transfer reactance during the existence of the fault and the high fault duty imposed upon the circuit breakers. Another limitation is the risk of unsuccessful reclosing against permanent faults. In fact, certain commercial systems in use today cannot reclose against any type of permanent fault without running the risk of exceeding the transient stability limit of the system or tie line involved.

It is, therefore, an object of my invention to provide a new and improved alternating current power system.

It is another object of my invention to provide a new and improved arrangement and correlation of the apparatus of an alternating current system of transmission and distribution whereby the transient stability limit may be improved.

It is a further object of my invention to provide in an alternating current power system an arrangement which will permit a reduction in the shock to a system during the existence of a fault, reduce the fault duty of the protective breakers and at the same time increase the transient stability power limit of the system.

In accordance with my invention, I utilize in a transmission system means to provide a cushioning reactance to reduce the fault shock during short circuit in combination with high speed reclosing means for the fault protective circuit breakers to reduce the circuit opening shock and thereby increase the transient stability power limit and at the same time effect a reduction in the fault duty imposed upon the protective circuit breakers.

My invention will be better understood from the following description taken in connection with the accompanying drawing, and its scope will be pointed out in the appended claims.

Figure 2:
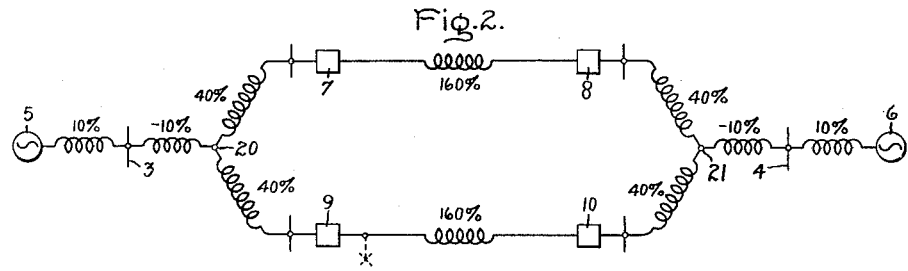

In the drawing, Fig. 1 is a diagrammatic representation of one embodiment of my invention as applied in a double circuit tie line of a typical transmission system, and Fig. 2 is a schematic diagram of a particular system of the type shown in Fig. 1 wherein the transformers are represented by an equivalent impedance transformer diagram.

Referring to Fig. 1 of the drawing, a schematic single-wire diagram has been utilized for purposes of simplicity to show my invention as applied to a typical three-phase double circuit tie line comprising transmitting circuits 1 and 2, respectively, for interconnecting two synchronous alternating current circuits or systems 3 and 4, respectively. The synchronous machines of system 3 are indicated symbolically by the alternating current machines 5 and transformers 5', and the synchronous machines of system 4 are indicated similarly by the alternating current machines 6 and transformers 6'. The tie line 1 is provided at the left-hand end, as viewed in the drawing, with a circuit breaker 7 and at the right-hand end with a circuit breaker 8. Similarly, tie line 2 is provided at the left-hand end with a circuit breaker 9 and at the right-hand end with a circuit breaker 10. These circuit breakers may all be alike and of a well known type provided with sufficiently high speed fault responsive and reclosing means to isolate a faulty line, clear the fault and reconnect the line to reestablish normal conditions. For purposes of simplifying the drawing, circuit breakers 7, 8 and 10, with suitable fault responsive and reclosing means, are indicated by a simple rectangular symbol while the schematic details thereof are shown for circuit breaker 9 as representative of suitable means for each of the circuit breakers. Since high speed fault responsive and reclosing means are well known and available commercially, I have represented the fault responsive means by a rectangle 11 containing a set of contacts 12 which are arranged to be closed by the contact bridging member 13 which in turn is operated in response to a fault or short circuit occurring within a given section of line 2 associated with circuit breaker 9. Contacts 12 are in a circuit to effect tripping of circuit breaker 9 by means indicated by the tripping relay 14 and the latch 15. Circuit breaker 9 is also provided with an automatic reclosing means of any suitable type, also well known in the art, whereby the associated circuit breaker may be closed as quickly as possible after the operation of the reclosing means which is set in operation by the closure of contacts 12. Since such high speed reclosing means are well known in the art and the particular structure thereof forms no part of my invention, I have represented this means schematically by a rectangle 16 containing a set of contacts 17 and a bridging member 18. Operation of the bridging member 18 to close contacts 17 closes a circuit to energize a closing coil 19 arranged to move circuit breaker 9 to its circuit closing position.

During fault disturbances there are two specific factors which require consideration for a proper analysis relative to transient stability. First, there is the fault shock which depends primarily on (1) the kilowatts being transmitted and (2) the increase in transfer reactance during the fault. The fault shock is greatest for three-phase faults and least for line-to-ground faults The ability of a system to maintain its stability under particular fault shocks depends upon the duration of the shock or fault. Second, there is the circuit opening shock when the faulty line is opened in the process of removing the fault. The circuit opening shock depends primarily on (1) the kilowatts transmitted during the fault or short circuit and (2) the increase in transfer reactance—with respect to the normal unfaulted transfer reactance—which results from the opening of the faulted circuit.

In accordance with my invention, I reduce the fault shock by providing a cushioning reactance in the circuit over which the power transfer is taking place. A suitable form of cushioning reactance may take the form of a multiple winding inductive device or transformer having the windings thereof in mutually inductive relation and, as illustrated, may comprise three-winding transformers 20 and 21 at each end of the double circuit tie lines 1 and 2. Although a tie line is usually arranged for transmitting power in either direction and the tie line illustrated is to be understood as representing such a tie line, it will simplify the description of the illustrated apparatus to assume that power is being transferred from circuit 3 to circuit 4. Under this assumption, the terms primary and secondary with respect to the transformers 20 and 21 will be used with this direction of power flow assumed. Obviously, if power flow is reversed, the designation of primary and secondary windings of the respective terminal transformers will have to be changed to correspond to the direction of power flow. The term "primary winding" is used in accordance with conventional and adopted standards to mean the winding on the input side of the transformer, whereas the term "secondary winding" means the winding on the output side of the transformer. Accordingly, transformer 20 is provided with a primary winding 22 connected to the system 3 and two secondary windings 23 and 24 connected to lines 1 and 2, respectively. Similarly, transformer 21 is provided with two primary windings 25 and 26 connected to lines 1 and 2, respectively, and a single secondary winding 27 connected to system 4. The details of three-winding or multiple-winding transformers of a suitable type are described and claimed in United States Letters Patents No. 1,815,842 granted July 21, 1931, upon an application of Frazer W. Gay and assigned to the assignee of the present application.

The first step in the present system toward increasing the transient stability of a tie line or system involves reducing substantially the fault shock over that existent in conventional systems. Such reduction is effected by decreasing the increase in transfer reactance during the time of a short circuit or fault over that obtained in the conventional double circuit bussed systems utilizing terminal buses or additional intermediate bussing. By conventional systems, I refer to such systems as are shown in Fig. 10, page 343 (Transactions section), of Electrical Engineering for June 1942, of the article at page 339 entitled "Analysis of the Application of High Speed Reclosing Breakers to Transmmission Systems," by Crary, Kennedy and myself. However, merely reducing the fault shock does not accomplish the desired ultimate result of increased transient stability since the circuit opening shock with the cushioning reactance means described may result in high transfer impedance when the fault is cleared, and thereby result in instability. However, by utilizing high speed reclosing in combination with fault shock reduction, both the fault shock and the circuit opening shock are reduced so as to result in an appreciable gain in transient stability coupled with a substantial reduction in short circuit breaker duty as contrasted with the present conventional bussed systems. Furthermore, the cushioning reactance means permits slower fault clearing and transfer of appreciable power during the fault.

The significance of the foregoing arrangements for the most advantageous operation of electrical systems utilizing the multiple-winding cushioning reactance means, combined with high speed reclosing, may be realized more particularly by a consideration of Fig. 2. This diagram is a schematic single line diagram utilizing the well known equivalent circuit for a three winding transformer, and also an equivalent inductive reactance circuit for tie lines 1 and 2 and for the terminal machines. The same numerals are used to indicate the elements of Fig. 2 corresponding to those of Fig. 1. In considering the effect of the impedance of the three-winding transformers, we may resolve, in the well known manner, the leakage impedance between pairs of windings into impedances of the individual windings. These impedances are referred to as leakage impedances in accordance with the common practice in transformer literature. Although there are other values for the various leakage impedances of three-winding transformers suitable to carry out my invention, I have indicated in Fig. 2, by the numerals expressed in per cent reactance and placed over the respective windings of the equivalent circuit elements, certain specific values which are satisfactory. The kva base for the per cent reactance is approximately one-half the total of the synchronous machines in the interconnected systems. For the transformer shown, the equivalent leakage reactance of the primary branch is indicated as being —10%, although it would be suitable to have a negative value such as —30% or a positive value of 10%. The generator reactance at each end is indicated as being 10%. The equivalent impedance of the primary branch and the generator reactance determines the voltage change on the unfaulted secondary circuit. With a net zero impedance in the primary branch and the generator reactance, the voltage of the unfaulted secondary circuit is unaffected when the other secondary circuit is short circuited. With a net positive impedance, the voltage of the unfaulted secondary circuit drops and with a net negative impedance the voltage of the unfaulted secondary circuit rises. This leakage reactance from the primary winding 22 to the secondary winding 23 acting alone may be 30 per cent, that from primary winding 22 to secondary winding 24 acting alone may be 30 per cent. Under these conditions, the leakage reactance between the two secondary windings 23 and 24 would be 80 per cent. The overall leakage reactance with equal division of current between secondary windings would be 10 per cent. The same leakage reactance relations are also indicated for the transformer 21.

The reduction in fault shock by the present system as contrasted with a conventional double circuit tie line bussed at the terminal stations with the same value of line reactance for each line, as indicated in the present system, may be readily determined by comparing the normal transfer reactance and the reactance under short circuit at the point indicated by the dotted $x$. I have chosen the values of leakage reactance in the present system to provide the same normal transfer reactance as is common practice in the conventional bussed system, namely, 120 per cent. This value in the present system is obtained by the fact that the overall impedance of the two terminal transformers together is 40 per cent and the lines in parallel are 80 per cent, making a total of 120 per cent transfer reactance. During a line-line-ground short circuit of the conventional bussed system, the transfer reactance is 347 per cent whereas in the present system the transfer reactance is 177 per cent. For a three-phase fault the transfer reactance of the conventional bussed system either with terminal bussing or terminal and intermediate bussing, is infinite. In the present system as illustrated, the transfer reactance is 240 per cent and this means that considerable power transfer can be effected during the fault. Thus the transfer reactance is doubled although an increase of four to five times may not be prohibitive for certain systems. The limiting value to which the transfer reactance may increase is that value which is sufficient to effect the necessary power transfer to keep the rotors of synchronous machines of the interconnected systems from reaching a phase displacement beyond which reclosing of the fault responsive breakers cannot maintain the desired synchronous relation. In the conventional bussed system, the short circuit duty is of the order of 550 per cent, whereas in the present system the short circuit duty is reduced in the order of 50 per cent of that of the conventional bussed system.

The circuit opening shock which occurs when the faulted circuit is opened is indicated by the increase in transfer reactance with respect to the normal unfaulted transfer reactance. In the conventional bussed system, this increase may be of the order of 30 per cent to 75 per cent, whereas in the present system the increase may be of the order of 80 per cent to 150 per cent. Thus the circuit opening shock in the present system with cushioning reactance means would be increased over that of the conventional bussed system if nothing further were done, but in accordance with my invention I reduce the circuit opening shock disturbance appreciably by high speed reclosing of the fault protective breakers and thereby effect a net gain in transient stability coupled with an appreciably decreased circuit breaker duty over that possible in the conventional bussed system.

The present system with the value of leakage reactances for the terminal transformers as is indicated in Fig. 2 is not affected by unsuccessful reclosure against a permanent three-phase fault and, hence, it can carry as much power as if reclosing had not been attempted. In contrast to this, the conventional bussed system, even with intermediate bussing to obtain a low value of circuit opening shock, loses as much from unsuccessful reclosure against a three-phase fault as it gains from successful reclosure. It follows, therefore, that the present system can utilize the benefits of the highest speed in reclosing regardless of the type of fault without risk or sacrifice in the gains available in transient stability.

While I have shown and described a particular embodiment of my invention, it will be obvious to those skilled in the art that many changes and modifications can be made without departing from my invention, and I, therefore, aim in the appended claims to cover all such changes and modifications as fall within the true spirit and scope of my invention.

What I claim as new and desire to secure by Letters Patent of the United States is:

1. In an electric power system, a plurality of synchronous alternating current circuits each including a synchronous dynamo-electric machine, a plurality of power transmitting circuits interconnecting said first mentioned circuits, circuit interrupting means arranged with at least one in each transmitting circuit, means arranged one with each of said circuit interrupting means and responsive to a fault in the transmitting circuit associated therewith for opening and quickly reclosing the associated interrupting means, and cushioning reactance means connected in said transmitting circuits and having such a value of reactance that the overall per cent reactance of said transmitting circuits during a fault involving all of the phase conductors on one of said power transmitting circuits does not exceed a value sufficient to effect the necessary transfer of power to keep said synchronous machines from reaching a phase displacement beyond which quick reclosure of said circuit interrupting means cannot maintain a synchronous relation between said plurality of synchronous circuits.

2. In an electric power system, a plurality of synchronous alternating current circuits, a plurality of power transmitting circuits interconnecting said first mentioned circuits, reactance means connected in each of said transmitting circuits and mutually coupled so that the per cent transfer reactance of said transmitting circuits during a short circuit or fault involving all of the phase conductors of one of said power transmitting circuits does not exceed substantially five times the per cent transfer reactance of said plurality of transmitting circuits in normal power transmitting condition, circuit interrupting means arranged with at least one in each transmitting circuit, and means arranged one with each of said circuit interrupting means and responsive to a fault in the transmitting circuit associated therewith for opening and quickly reclosing the associated circuit interrupting means.

3. In combination, two synchronous alternating current systems, a power transmitting line comprising a plurality of power transmitting circuits for interconnecting said systems, multiple winding inductive means interposed between one of said systems and said line and comprising a single winding connected to said one system and a plurality of windings mutually coupled inductively with said single winding and each connected to a different transmitting circuit, circuit interrupting means arranged in each transmitting circuit, and means arranged one with each of said circuit interrupting means and responsive to a fault in the transmitting circuit associated therewith for opening and quickly reclosing the associated circuit interrupting means, said inductive means having such a value of leakage reactance upon interruption of less than all of said power transmitting circuits that the increase in overall transfer reactance between said alternating current systems and the time of reclosure of said circuit interrupting means shall be of such values as to maintain said systems in synchronous relation during the transient period initiated by the operation of said circuit interrupting means upon the occurrence of a fault in said transmitting line.

4. In combination, two electric systems each including a synchronous dynamo-electric machine, a power transmission medium comprising a plurality of power transmitting circuits for interconnecting said systems, multiple winding transformers arranged one at each end of said transmitting circuits, one of said multiple winding transformers comprising a single primary winding connected to one of said electric systems and having a plurality of secondary windings each connected to a different transmitting circuit, the other of said multiple winding transformers comprising a plurality of primary windings each connected to a different transmitting circuit and a single secondary winding connected to the other of said electric systems, circuit interrupting means arranged in each transmitting circuit, and means arranged one with each of said circuit interrupting means and including high speed relaying means responsive to a fault in the transmitting circuit associated therewith for opening and quickly reclosing the associated circuit interrupting means, said transformers each having such a value of leakage reactance during a fault of all the phase conductors of less than all of said transmitting circuits and during open circuiting of less than all of said transmitting circuits that the overall transfer reactance between said two electric systems during said fault and during said open circuiting condition shall have a value sufficient to effect the necessary transfer of power between said systems to keep said electric systems from departing from a synchronous relation during the transient period initiated by operation of said circuit interrupting means upon the occurrence of a fault in said power transmitting medium.

5. In combination, two synchronous alternating current systems, a tie line interconnecting said systems and comprising a pair of transmitting circuits, a three-winding transformer arranged at a terminal of said transmitting circuits, said three-winding transformer having a single winding connected to one of said systems and two other windings mutually coupled inductively with said single winding and each connected to a different transmitting circuit, circuit interrupting means arranged in each transmitting circuit, and means arranged one with each of said circuit interrupting means and responsive to a fault in the transmitting circuit associated therewith for opening and quickly reclosing the associated circuit interrupting means, said transformer having such a value of leakage reactance during a fault upon one of said transmitting circuits that the increase in overall transfer reactance upon interruption of one of said transmitting circuits shall be greater than 75 per cent and less than 500 per cent of the transfer reactance between said alternating current systems during unfaulted power transmitting conditions.

6. In combination, two synchronous alternating current systems, a tie line interconnecting said systems and comprising a pair of transmitting circuits, three-winding transformers arranged one at the respective terminals of said transmitting circuits, one of said three-winding transformers having a single primary winding connected to one of said systems and its secondary windings connected respectively to a different one of the transmitting circuits, the other of said three-winding transformers having a plurality of primary windings each connected to a different transmitting circuit and a single secondary winding connected to the other of said systems, circuit interrupting means arranged one at each end of each transmitting circuit, and means arranged one with each of said circuit interrupting means and including high speed relaying means responsive to a fault within a certain section of the transmitting circuit associated therewith for opening and quickly reclosing the associated interrupting means said transformers each having such a value of leakage reactance during a fault of all of the phase conductors of one of said transmitting circuits that the overall transfer reactance shall not exceed five times the overall transfer reactance of said pair of transmitting circuits in unfaulted power transmitting condition and that the increase in transfer reactance between said systems upon interruption of said one transmitting circuit shall be in excess of 75 per cent of the overall transfer reactance of said pair of transmitting circuits in unfaulted power transmitting condition.

7. In combination, two synchronous alternating current systems, a tie line interconnecting said systems and comprising a pair of transmitting circuits, three-winding transformers arranged one at the respective terminals of said transmitting circuits and interconnecting said transmitting circuits and said systems, the overall leakage reactance of each of said transformers for equal division of current in said transmitting circuits being of the order of ten per cent and the overall leakage reactance of each transformer when one of said transmitting circuits is open circuited being of the order of two to six times as great, circuit interrupting means arranged one at each end of each transmitting circuit, and means arranged one for each of said circuit interrupting means and including high speed relaying means responsive to a fault within a certain portion of the transmitting circuit associated therewith for opening and quickly reclosing the associated interrupting means.

CHARLES A. WOODROW.